(12) United States Patent
Borwick, III et al.

(10) Patent No.: US 6,771,081 B2
(45) Date of Patent: Aug. 3, 2004

(54) LIQUID-MEDIUM IMMERSED MEMS DEVICES

(75) Inventors: Robert L. Borwick, III, Thousand Oaks, CA (US); Philip A. Stupar, Oxnard, CA (US); Jeffrey F. DeNatale, Thousand Oaks, CA (US)

(73) Assignee: Rockwell Scientific Licensing, LLC, Thousand Oaks, CA (US)

( * ) Notice: Subject to any disclaimer, the term of this patent is extended or adjusted under 35 U.S.C. 154(b) by 0 days.

(21) Appl. No.: 10/227,141

(22) Filed: Aug. 22, 2002

(65) Prior Publication Data

US 2004/0036483 A1 Feb. 26, 2004

(51) Int. Cl.$^7$ .......................... G01R 27/26; G01R 29/12
(52) U.S. Cl. ...................................... 324/663; 324/457
(58) Field of Search .......................... 324/457–458, 324/658–661, 668, 675; 73/700, 718, 724; 360/270, 294.3; 310/309

(56) References Cited

U.S. PATENT DOCUMENTS

| | | | |
|---|---|---|---|
| 5,959,516 A | 9/1999 | Chang et al. .................. 334/14 |
| 6,188,322 B1 | 2/2001 | Yao et al. .................. 340/664 |
| 6,359,757 B1 * | 3/2002 | Mallary .................. 360/294.3 |
| 6,495,944 B2 * | 12/2002 | Hirano et al. ................ 310/309 |

* cited by examiner

Primary Examiner—N. Le
Assistant Examiner—Vincent Q. Nguyen
(74) Attorney, Agent, or Firm—Koppel, Jacobs, Patrick & Heybl

(57) ABSTRACT

Micro-electromechanical (MEM) devices having their fixed and movable members immersed in a liquid medium. Movement is effected by applying a stimulus which creates a force that causes the movable member to move with respect to the fixed member. The movable and fixed members are immersed in a liquid medium having desired characteristics. The liquid is preferably selected to have a viscosity which critically damps the motion of the movable member. The liquid may also be chosen to provide a dielectric constant greater than one, which, where applicable, increases the electrostatic force created for a given drive voltage, and the device's capacitance sensing range, over what they would be in air. The liquid medium might also be used to improve the device's thermal dissipation characteristics, or to provide improved isolation between structures.

17 Claims, 5 Drawing Sheets

LIQUID-MEDIUM IMMERSED MEMS DEVICES

BACKGROUND OF THE INVENTION

1. Field of the Invention

This invention relates to the field of microelectromechanical (MEM) devices, and particularly to the use of a liquid medium to improve the mechanical and electrical performance of such devices.

2. Description of the Related Art

Micro-electromechanical (MEM) devices feature at least one member which is movable with respect to another member which is typically fixed. Movement of the movable member is typically effected via electrostatic force: appropriate voltages are applied to both the movable and fixed members such that the resulting electrostatic force drives the movable member in a desired direction.

Such devices are subject to a number of problems. For example, the device's response time can be degraded due to mechanical "ringing" that can occur when a movable member is actuated such that it moves from one position to another. In addition, the device's sensitivity to external mechanical vibrations can limit its usefulness to low-g environments.

One type of MEM device is a tunable capacitor. Capacitance is tuned by controlling the overlap of the capacitor plates (which may be parallel plates or interdigitated fingers). This may be accomplished by coupling one of the plates to a movable member which includes a set of "fingers", which are interdigitated with a set of fingers on a fixed member. Movement is effected by applying a drive voltage across the fixed and movable members, creating an electrostatic force which moves the movable member—and thus the capacitor plates—in a desired direction.

MEM tunable capacitors suffer from several drawbacks, however. Constraints on device size typically limit the achievable capacitance values to the 1–10 pF range. High drive voltages (up to 35–40 volts) are often necessary to obtain the achievable capacitance range. Furthermore, the time required to achieve a desired capacitance value may be unacceptably long, due to the mechanical ringing noted above.

A known MEM current sensor is similarly affected. A current to be measured is used to drive the movable member of a tunable capacitor as described above, and the resulting capacitance is sensed to set an analog signal or digital output bits which represent the sensed current value. Unfortunately, the problems noted above also impact this device: current sensing range is limited due to device size constraints and capacitance value limitations, and response time may be unacceptably long. In addition, existing designs—which operate in air—have limited heat dissipation capabilities which might limit the maximum current that can be sensed. Furthermore, the sensor's current-carrying member may need to be electrically isolated from the sensor's other structures to prevent breakdown; this isolation can result in a device which is unacceptably large.

SUMMARY OF THE INVENTION

MEM devices having their fixed and movable members immersed in a liquid medium are presented. When the liquid is properly selected, the devices' mechanical and electrical performance are improved.

A MEM device in accordance with the present invention includes at least one member capable of moving with respect to a second, typically fixed member. Movement is effected with a drive voltage or an applied current which creates a force—such as an electrostatic, Lorentz, or thermal force—that causes the movable member to move with respect to the fixed member. The movable and fixed members are immersed in a liquid medium having particular characteristics. The liquid medium is preferably selected to have a viscosity which critically damps the motion of the movable members, thereby improving the device's mechanical performance. The liquid may also be chosen to provide a dielectric constant greater than one, such that, where applicable, the device's maximum capacitance and capacitance range are increased, and the electrostatic force created for a given drive voltage is increased over what it would be in air—thereby improving the device's electrical performance. The liquid medium might also be used to improve the device's thermal dissipation characteristics, or to provide improved isolation between the different structures which make up the device.

Further features and advantages of the invention will be apparent to those skilled in the art from the following detailed description, taken together with the accompanying drawings.

BRIEF DESCRIPTION OF THE DRAWINGS

FIG. 1b is a schematic diagram which corresponds to the device shown in FIG. 1a.

DETAILED DESCRIPTION OF THE INVENTION

Figure 1A:
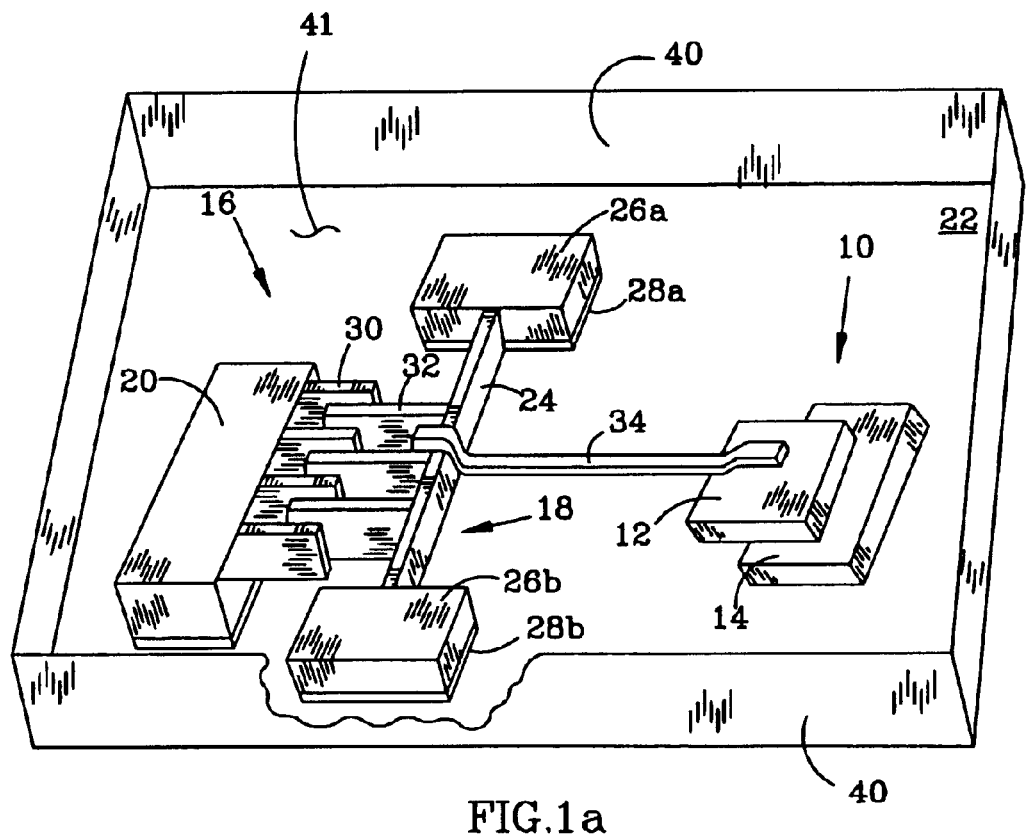
FIG. 1a is a perspective view of an exemplary MEM device in accordance with the present invention.
Figure 1B:
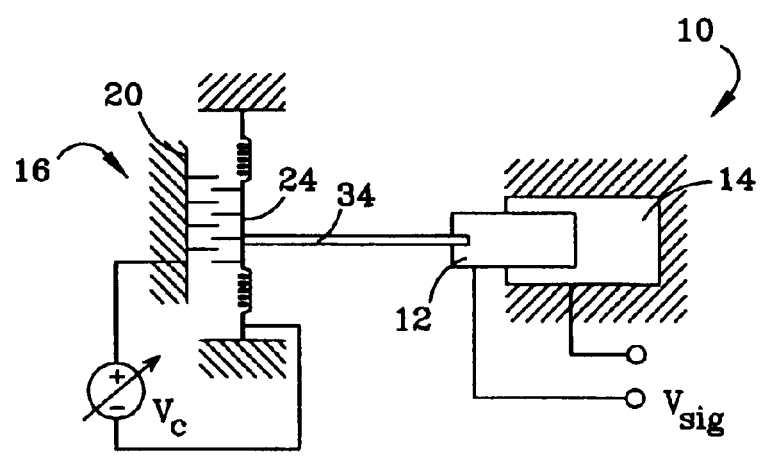

An exemplary embodiment of a MEM device per the present invention is shown in FIG. 1a, and a corresponding electrical schematic shown in FIG. 1b. A MEM tunable capacitor is shown in this example, though the invention is also applicable to other MEM devices. Here, the device includes a signal capacitor 10 made up of parallel plates 12 and 14, which also serve as the signal capacitor's terminals. Signal capacitor 10 is controlled by a control capacitor 16, which is made up of a movable member 18 and a fixed member 20. Fixed member 20, which also serves as a contact for capacitor 10, is anchored to the substrate 22, and movable member 18 is suspended above the substrate by a flexure structure which includes a beam 24 suspended between two contacts 26a and 26b which are anchored to the substrate through insulation layers 28a and 28b.

A set of fingers 30 extend from fixed member 20, and a second set of fingers 32, interdigitated with fingers 30, extend from movable member 18. Movable member 18 is coupled to the top plate of signal capacitor 10 via a mechanical coupler 34. In operation, a drive voltage $V_c$ is applied between fixed member 20 and movable member 18. This creates an electrostatic force between the members which causes beam 24 to be attracted to fixed member 20. The movement of beam 24 is coupled to the top plate 12 of signal capacitor 10, such that the degree of overlap between the top and bottom plates—and thus the capacitance of signal capacitor 10—varies with the applied drive voltage. Additional details concerning a MEM tunable capacitor of this type can be found in U.S. Pat. No. 5,959,516 to Chang et al.

The MEM device is packaged in a manner which allows at least the fixed member 20 and movable member 18 to be immersed in a liquid medium. For example, as shown in FIG. 1, a set of walls 40 completely surrounds the device. The device would also include a cover (not shown). The packaging is arranged such that the device can be immersed in a liquid medium 41, which can then be sealed within the package. Means for adding the liquid and sealing the package are well-known to those familiar with integrated circuit packaging technology.

Figure 1C:
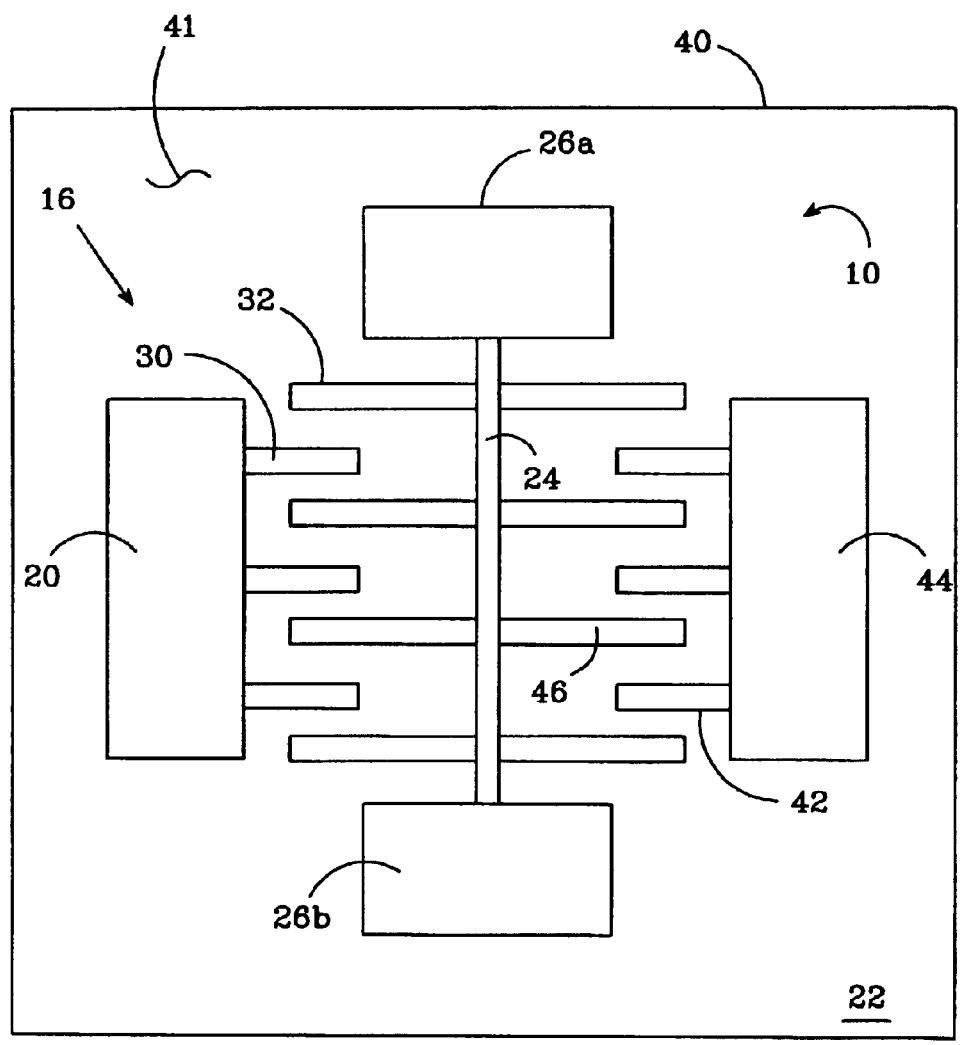
FIG. 1c is a plan view of another exemplary MEM device in accordance with the present invention.

A plan view of a preferred variation of the MEM tunable capacitor shown in FIG. 1a is shown in FIG. 1c. Here, rather than parallel plates, signal capacitor 10 is made up of a first set of fingers 42 mounted to a fixed member 44, and a second set of fingers 46 mounted to beam 24 and interdigitated with fingers 42. This capacitor works as described above, except that the capacitance provided by signal capacitor 10 varies with the overlap between fingers 42 and 44. The device is again surrounded by walls 40, so that it may be immersed in a liquid medium 41.

Note that the MEM devices shown in FIGS. 1a, 1b and 1c discussed herein are merely exemplary. The invention is useful with any MEM device in which one or more members moves in response to a force created by a drive voltage or applied current. The discussion below presumes a MEM device has at least one movable member which moves with respect to a fixed member; however, the invention is equally applicable to MEM devices having movable members which move with respect to each other.

The selection of an appropriate liquid medium is essential to the invention. The liquid must have characteristics which cause the mechanical and/or electrical performance of the MEM device to be improved when compared with a comparably-driven equivalent device which operates in air. The primary considerations with respect to an appropriate liquid medium are viscosity and dielectric constant. The thermal properties and breakdown characteristics of the liquid may also be important, depending on the application. Each of these characteristics is discussed below.

Figure 2:
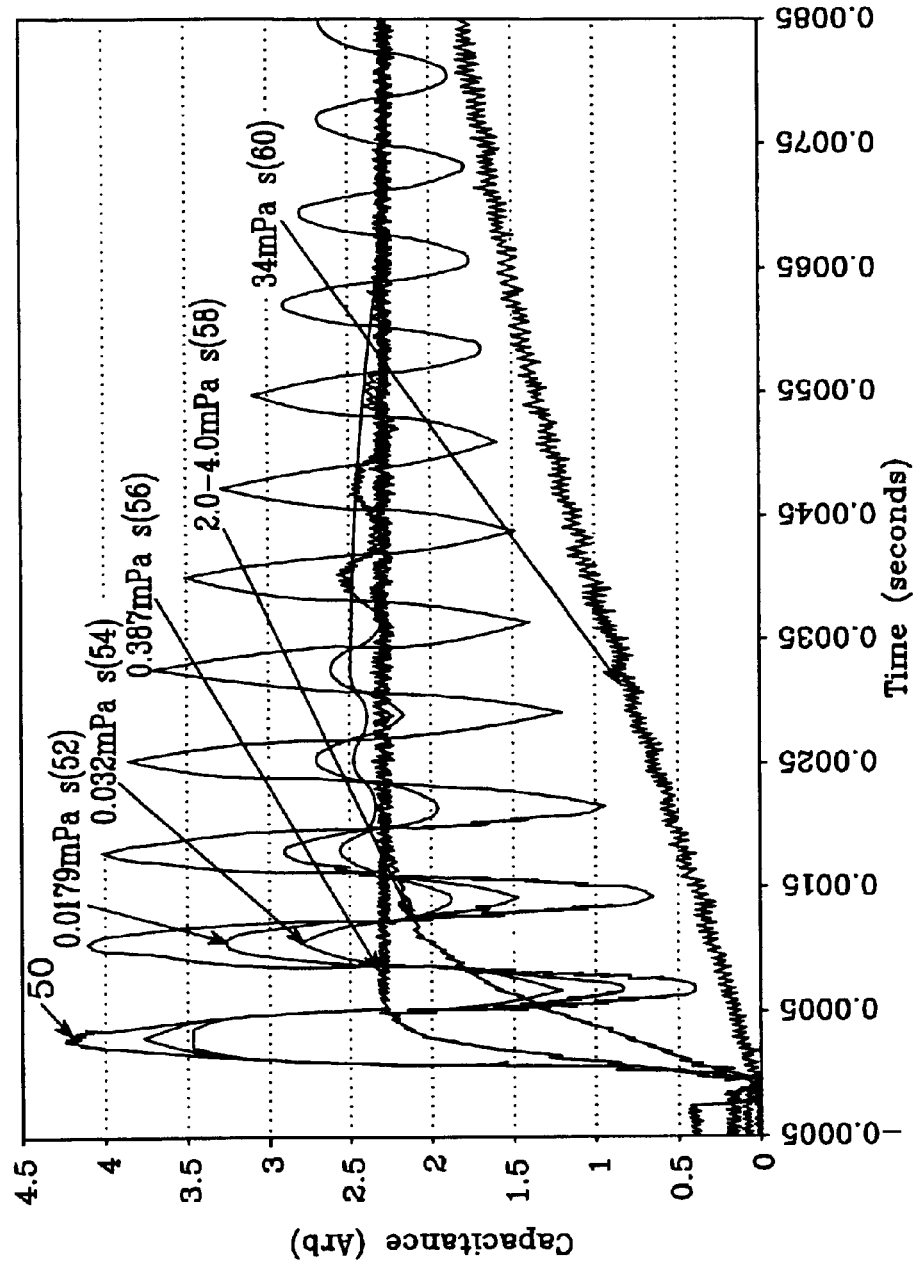
FIG. 2 is a graph illustrating the step response of a MEM tunable capacitor per the present invention for several different liquid mediums.

The viscosity of the liquid medium directly affects the mechanical performance of the MEM device. Mechanical ringing and thus response time can be significantly reduced when a liquid having the proper viscosity is employed. Ideally, the liquid selected will provide approximately critical damping for the device's movable members. This is illustrated in the graph shown in FIG. 2, which depicts the step response of a MEM device in various media (gas and liquid). In this example, the step response of a MEM tunable capacitor is shown, with capacitance plotted vs. time. Trace 50 is the response of the MEM device when operated in a vacuum (viscosity of ~0), as in the prior art. An extended period of mechanical ringing is clearly seen, with the response time of the device correspondingly degraded.

When the device is packaged in nitrogen gas having a viscosity of 0.0179 mPa s (trace 52), the magnitude and duration of the ringing is significantly reduced, though the response is still underdamped. When neon gas having a viscosity of 0.032 mPa s is used (trace 54), damping is further improved and the response time further reduced. However, from FIG. 2 it is clear that the viscosity of these gasses is insufficient to critically damp the device.

Use of a liquid having a viscosity of 0.387 mPa s (trace 56), such as heptane at 25 C, provides a nearly ideal critically damped response for this particular device. Note that heptane is highly flammable, and should be used with extreme caution.

Fluids which overdamp the device are also shown: a liquid having a viscosity of 2–4 mPa s (trace 58), such as LPS1 Greaseless Lubricant from LPS Labs, Inc., provides a slightly overdamped response, and a liquid having a viscosity of 34 mPa s (trace 60), such as Fomblin pump oil Y06/6, severely overdamps the device.

While it is preferable that the selected liquid provide critical damping, it should be noted that significant improvements in response time may be obtained with fluids that provide only approximately critical damping. For example, in FIG. 2, the responses shown in traces 56 and 58, while not critically damped, are still substantially better than that found when operating in air and other gasses.

The resonant frequency of a MEM device defines an upper limit on the speed with which the moveable member may move. A higher resonant frequency can be achieved by utilizing a stiffer device structure. However, in a conventional MEM device, a stiffer structure can extend the duration of the ringing which occurs when the device is actuated, and thus response time is degraded. The present invention overcomes this limitation by achieving approximately critical damping using a liquid medium. Now, a stiffer flexure structure can be employed and a higher resonant frequency thereby realized. Then, because the response is properly damped, response time is actually lowered, rather than degraded.

Immersing a MEM device is a liquid medium as described herein also reduces the device's sensitivity to external mechanical vibrations. Normally, such vibrations would result in the same sort of mechanical ringing that occurs when the device is actuated. Here, however, use of a liquid medium of appropriate viscosity serves to substantially reduce the adverse effects of external vibrations.

Note that while the device shown in FIGS. 1a and 1b is actuated via the generation of electrostatic force, the invention is equally applicable to MEM devices which employ other forces. Mechanical ringing and a degraded response time can afflict any MEM device, whether its means of actuation is electrostatic, Lorentz, thermal, or some other force. However, regardless of the actuation means, immersing the MEM device in a liquid medium as described herein provides damping which improves the device's mechanical performance.

The dielectric constant of the liquid medium may also be important, particularly for MEM devices which employ capacitance in some fashion (such as a MEM tunable capacitor), and/or MEM devices actuated by means of electrostatic force. The electrostatic force created by a drive voltage or applied current varies with the dielectric constant, with a higher dielectric constant resulting in a stronger electrostatic force. Capacitance also increases with increasing dielectric constant. Air has a dielectric constant of one, so immersing an electrostatically-actuated MEM capacitor in a fluid having a dielectric constant greater than one will result in a stronger electrostatic force for a given drive voltage, and a higher capacitance.

This fact can be used to improve the electrical performance of certain MEM devices. For example, for a MEM tunable capacitor as described above, increasing the dielectric constant increases the maximum capacitance of the device, as well as the capacitance range of the device. An increased maximum capacitance can enable the size of the device to be reduced. A higher dielectric constant can also reduce the drive voltage necessary to achieve the maximum capacitance value, as the higher electrostatic force reduces the drive voltage needed to drive the movable member over its full range of motion.

Figure 3:
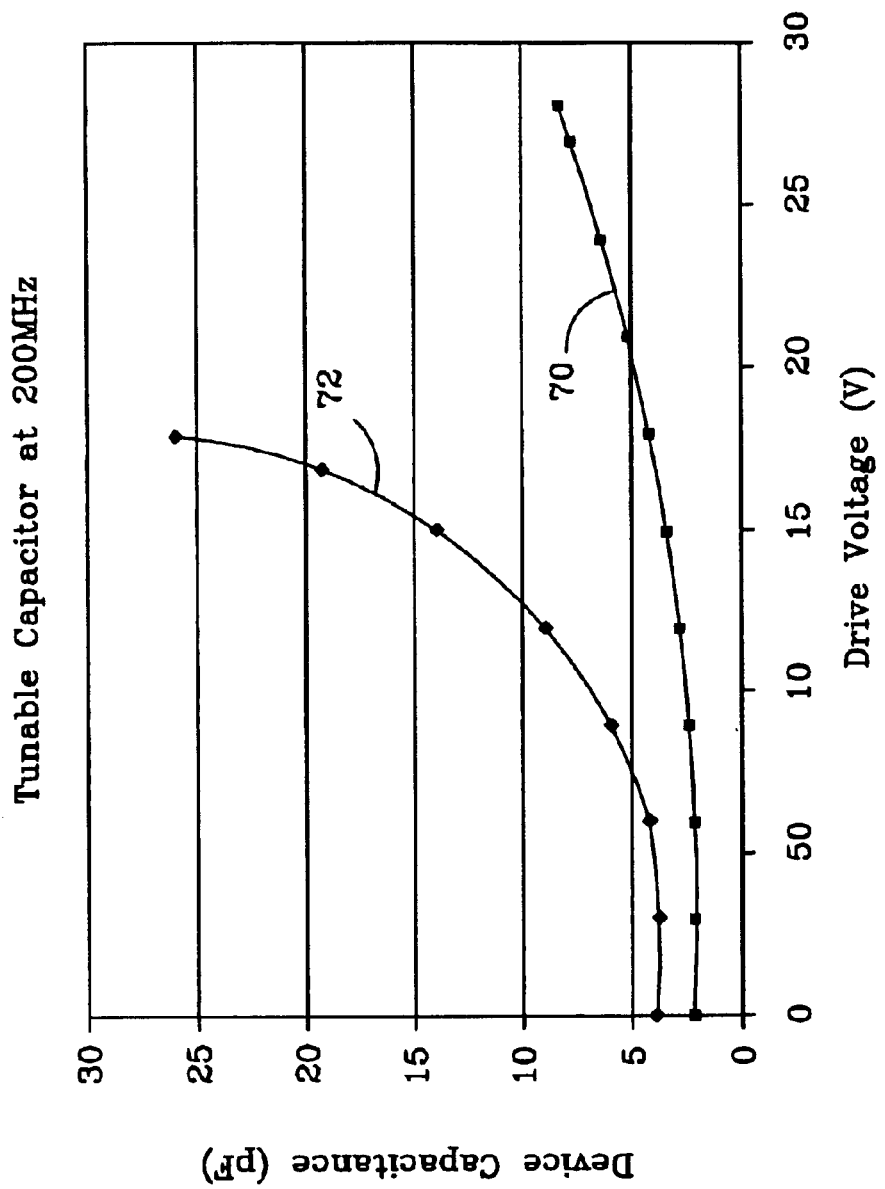
FIG. 3 is a graph of capacitance vs. drive voltage for a MEM tunable capacitor per the present invention, and for a prior art capacitor.

The effect of a higher dielectric constant is shown in FIG. 3, which plots capacitance versus drive voltage for a MEM tunable capacitor. The lower trace (70) depicts the device's performance in air (dielectric constant=1) and the upper trace (72) is for a comparable MEM tunable capacitor immersed in a liquid having a dielectric constant of approximately 4, such as Fomblin pump oil Y06/6. When operated in air, an exemplary MEM tunable capacitor provides a capacitance range of about 2 pF to about 8 pF (4×), with a drive voltage of about 28 volts required to achieve the maximum capacitance. However, in the liquid medium, the same tunable capacitor provides a capacitance range of about 4 pF to about 26 pF (6.5×), while requiring a drive voltage of only about 18 volts to achieve the maximum capacitance.

As the MEM device is immersed in the liquid medium, it is essential that the liquid be non-conductive—so that electrical shorts between members, contacts, and/or terminals are avoided.

The mechanical and electrical improvements provided by the invention give the device designer a considerable amount of flexibility when defining a MEM device's characteristics. Parameters such as device stiffness, drive voltage, response time, and capacitance range can now be traded-off and optimized for a particular application with much more latitude than was previously possible.

Every MEM tunable capacitor has a certain amount of parasitic capacitance, which arises due to features other than the plate or finger overlap that provides the tunable capacitance. For example, a parasitic capacitance is created between the device structure and the substrate upon which the device is built. This parasitic capacitance defines the minimum capacitance for a MEM tunable capacitor. Immersing the MEM device in a liquid medium having a dielectric constant greater than one does increase the device's parasitic capacitance—but only slightly. This is evident with reference to FIG. 3, which shows that the minimum device capacitance in air is about 2 pF, and the minimum in the liquid medium is about 4 pF. However, not all sources of parasitic capacitance scale linearly with dielectric constant; as such, the capacitance which arises due to plate or finger overlap is more affected by a higher dielectric constant than are the parasitics. Since the maximum capacitance and the overall capacitance range of the device are increased, the invention serves to reduce the adverse effect of parasitic capacitance on device performance.

The invention is particularly useful with MEM devices which tune a capacitance or employ capacitance sensing. A MEM current sensor, for example, is such a device. As described, for example, in U.S. Pat. No. 6,188,322 to Yao et al., a MEM current sensor operates by applying a current to be measured to a current-carrying beam. When operated in the presence of a magnetic field, the applied current generates a Lorentz force which varies with the current and causes the beam to move. The moving beam is coupled to a MEM tunable capacitor, such that the capacitance of the MEM tunable capacitor varies with the magnitude of the sensed current.

As noted above, a conventional MEM current sensor is subject to mechanical ringing which affects response time, limited resolution due to a limited capacitance range, and a limited current carrying capability due to heat dissipation concerns. The invention reduces the adverse effects from all of these factors.

As with the MEM tunable capacitor discussed above, the invention requires that at least the movable and fixed members of the MEM current sensor be immersed in a non-conductive liquid medium. As discussed above, the viscosity of the liquid medium directly affects the mechanical performance of the MEM device. Ideally, the liquid selected will provide approximately critical damping for the device's movable members. When the MEM current sensor is immersed in a fluid having the proper viscosity, the magnitude and duration of mechanical ringing is significantly reduced, as is the device's response time. The damping allows a stiffer flexure structure to be employed, and thus a higher resonant frequency to be realized—enabling even shorter response times.

Figure 4:
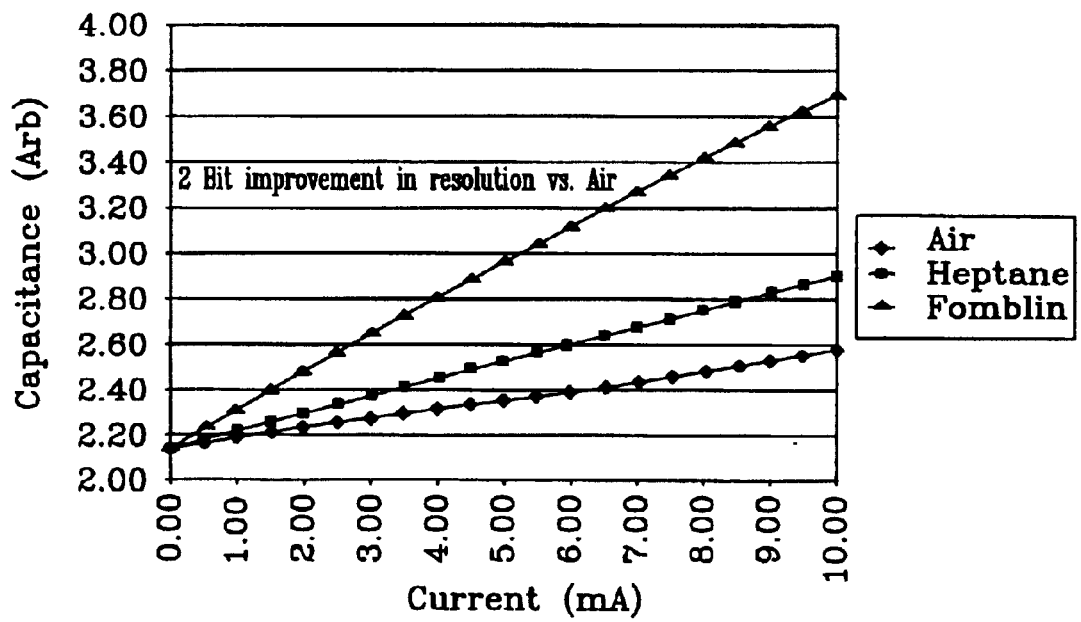
FIG. 4 is a graph of capacitance vs. current for a MEM current sensor using several different dielectrics.

The liquid medium preferably has a dielectric constant greater than one, so that the resulting change in capacitance for a given applied current is larger than it would be in air. This decreases the minimum current which can be sensed, and thereby increases the achievable resolution of the MEM current sensor. This is illustrated in the graph shown in FIG. 4, which plots capacitance versus applied current for three different media. In air (dielectric constant=1), a 0–10 mA current swing results in a capacitance swing of about 2.15 pF to about 2.58 pF (capacitance values are arbitrary). In liquid heptane (dielectric constant=1.92), the same current swing produces a capacitance swing of about 2.15 pF to about 2.9 pF. When the liquid medium is Fomblin pump oil Y06/6 (dielectric 4), the capacitance swing becomes about 2.15 pF to about 3.7 pF. This represents a nearly 4× increase in capacitance range for a given current swing, which is a 2 bit improvement in resolution when compared with operating the device in air.

Figure 5:
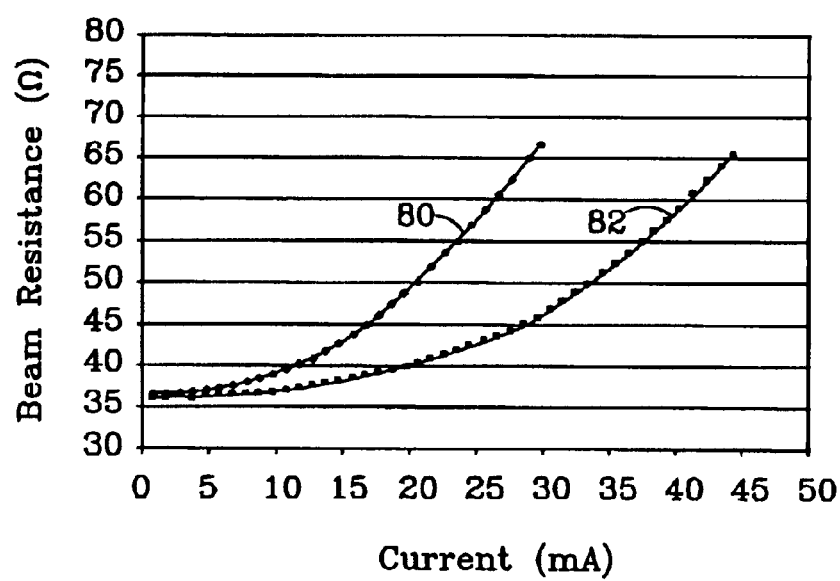
FIG. 5 is a graph of resistance vs. current for a MEM current sensor per the present invention, and for a prior art current sensor.

Use of a liquid medium as described herein can also improve the thermal characteristics of a MEM current sensor (or any MEM device to which the invention is applicable). As noted above, the maximum current that can be measured by a MEM current sensor is limited by the heat dissipation characteristics of the current-carrying beam, the current-carrying capacity of which falls with increasing temperature. Immersing the device in a liquid medium can improve the beam's heat dissipation characteristics. In addition, the liquid medium reduces the amount of heat that is generated by reducing the thermoresistive effect in the current-carrying beam. This is illustrated in the graph shown in FIG. 5, which plots the resistance of the current-carrying beam versus the applied current. The upper trace (80) depicts the device's performance in air and the lower trace (82) is for the same MEM current sensor immersed in Fomblin pump oil Y06/6. The presence of the liquid lowers the resistance of the beam for a given current, and thereby extends the current range which can be carried by the beam without damaging the device.

Devices such as a MEM current sensor often include some sort of structure to provide electrical isolation between the current-carrying beam and the device's other structures. In a conventional device, adequate isolation might only be achieved by having a large area separating the beam from the other structures, which results in the device having a large die size. The use of a liquid medium as described herein can mitigate this problem. If a liquid medium is used which has a better breakdown characteristic than air, isolation can be improved without compromising the overall size of the device.

The effect of the selected liquid medium on the integrity of the device should be considered. For example, the device may include epoxy bonds which are degraded when exposed to certain liquids.

It should also be noted that the viscosity of a liquid changes with temperature, as does the damping provided by the selected liquid. Ideally, the viscosity of the selected liquid is relatively constant over temperature.

Further note that the use of a liquid medium having a dielectric constant greater than one will increase all electrostatic forces within a MEM device. Thus, even undesired electrostatic forces will be strengthened.

The present invention may be employed with any MEM device, as long as it is possible to encapsulate the device so that its members can be immersed in the liquid medium. The known methods of fabricating such MEM devices are still applicable, except for the addition of a means of encapsulating the device—which may be accomplished by any number of known methods. However, while the basic fabrication steps are essentially unchanged, specific aspects of the device structure may change, as the invention enables the designer to optimize parameters such as device stiffness and size for a particular application with much more latitude than was previously possible.

While particular embodiments of the invention have been shown and described, numerous variations and alternate embodiments will occur to those skilled in the art. Accordingly, it is intended that the invention be limited only in terms of the appended claims.

We claim:

1. A liquid medium-immersed micro-electromechanical (MEM) current sensor, comprising:
   a MEM device which includes at least one member capable of moving with respect to a second member, and
   a non-conductive liquid medium in which said at least one movable member and said second member are immersed, wherein said at least one member moves with respect to said second member in response to an applied current which, when in the presence of a magnetic field, creates a Lorentz force which displaces said at least one member with respect to said second member, said current sensor arranged to produce a capacitance which varies with the position of said at least one movable member with respect to said second member.

2. The MEM device of claim 1, wherein said at least one movable member is a current-carrying beam which carries said applied current, said liquid medium selected to improve the heat dissipation of said current-carrying beam in comparison with a comparably-driven equivalent device which operates in air.

3. The MEM device of claim 1, wherein said applied current is carried on a current-carrying beam which is coupled to one of said movable or second members, said device having an associated breakdown voltage between said current-carrying beam and the device's other structures, said liquid medium selected to improve said breakdown voltage in comparison with a comparably-driven equivalent device which operates in air.

4. The current sensor of claim 1, wherein said at least one member which moves with respect to said second member in response to an applied current is a current-carrying beam which carries said applied current, further comprising:
   a signal capacitor comprising first and second plates immersed in said non-conductive liquid medium, at least one of said plates coupled to and thereby moving with said current-carrying beam,
   the capacitance of said signal capacitor varying with the position of said at least one movable plate with respect to said second plate, and thereby with the magnitude of said applied current.

5. The current sensor of claim 4, wherein said liquid medium has a dielectric constant greater than one such that said liquid medium increases the maximum tunable capacitance between said first and second plates and thereby increases the resolution with which said applied current can be sensed.

6. The current sensor of claim 1, wherein said MEM current sensor has an associated response time, said liquid medium having a viscosity which approximately critically damps the motion of said at least one movable member such that said response time is decreased in comparison with a comparably-driven equivalent device which operates in air.

7. A liquid medium-immersed micro-electromechanical (MEM) device, comprising:
   a MEM device which includes at least one member capable of moving with respect to a second member in response to a stimulus which creates a Lorentz force which displaces said at least one movable member with respect to said second member, said MEM device having an associated response time, and
   a non-conductive liquid medium in which said at least one movable member and said second member are immersed, said liquid medium having a viscosity which approximately critically damps the motion of said at least one movable member such that said response time is decreased in comparison with a comparably-driven equivalent device which operates in air.

8. A liquid medium-immersed micro-electromechanical (MEM) device, comprising:
   a MEM device which includes at least one member capable of moving with respect to a second member in response to a stimulus which creates a thermal force which displaces said at least one movable member with respect to said second member, said MEM device having an associated response time, and
   a non-conductive liquid medium in which said at least one movable member and said second member are immersed, said liquid medium having a viscosity which approximately critically damps the motion of said at least one movable member such that said response time is decreased in comparison with a comparably-driven equivalent device which operates in air.

9. A liquid medium-immersed micro-electromechanical (MEM) tunable capacitor, comprising:
   a MEM control capacitor which includes at least one member capable of moving with respect to a second member in response to a drive voltage which creates a force between said at least one member and said second member,
   a signal capacitor comprising first and second plates, at least one of which is coupled to and thereby moves with a respective one of said control capacitor's movable members,
   a non-conductive liquid medium in which said at least one movable member, said second member, and said first and second plates, are immersed,
   the capacitance of said signal capacitor varying with the position of said at least one movable plate with respect to said second plate.

10. The tunable capacitor of claim 9 wherein said liquid medium has a dielectric constant greater than one such that said liquid medium increases the maximum tunable capacitance between said first and second plates in comparison with a comparably-driven equivalent device which operates in air.

11. The tunable capacitor of claim 10 wherein said force is an electrostatic force and said liquid medium increases the electrostatic force between said movable and second members for a given applied drive voltage in comparison with a comparably-driven equivalent device which operates in air.

12. The tunable capacitor of claim 9, wherein said MEM tunable capacitor has an associated response time and said liquid medium has a viscosity which approximately critically damps the motion of said at least one movable member such that said response time is decreased an comparison with a comparably-driven equivalent device which operates in air.

13. The tunable capacitor of claim 9, wherein said force is a Lorentz force.

14. The tunable capacitor of claim 9, wherein said force is a thermal force.

15. A liquid medium-immersed micro-electromechanical (MEM) current sensor, comprising:

a magnetic field, a MEM device which includes a current-carrying beam which carries a current to be sensed through said magnetic field and which moves with respect to a fixed member in response to said current which, in the presence of said magnetic field, creates a Lorentz force which displaces said current-carrying beam with respect to said fixed member, a non-conductive liquid medium in which said current-carrying beam and said fixed member are immersed, and a signal capacitor comprising first and second plates immersed in said non-conductive liquid medium, at least one of said plates coupled to and thereby moving with said current-carrying beam, the capacitance of said signal capacitor varying with the position of said at least one movable plate with respect to said second plate, and thereby with the magnitude of said applied current.

16. The current sensor of claim 15, wherein said liquid medium has a dielectric constant greater than one such that said liquid medium increases the maximum tunable capacitance between said first and second plates and thereby increases the resolution with which said applied current can be sensed.

17. The current sensor of claim 16, wherein said MEM current sensor has an associated response time, said liquid medium having a viscosity which approximately critically damps the motion of said at least one movable member such that said response time is decreased in comparison with a comparably driven equivalent device which operates in air.

* * * * *

UNITED STATES PATENT AND TRADEMARK OFFICE
CERTIFICATE OF CORRECTION

PATENT NO. : 6,771,081 B2
DATED : August 3, 2004
INVENTOR(S) : Borwick, III et al.

It is certified that error appears in the above-identified patent and that said Letters Patent is hereby corrected as shown below:

Column 1,
Line 3, insert:
-- This invention was made with Government support under Contract F30602-97-C-0091 awarded by the Air Force. The Government has certain rights in the invention. --.

Signed and Sealed this

Twenty-seventh Day of September, 2005

JON W. DUDAS
*Director of the United States Patent and Trademark Office*